(12) United States Patent
Becerra et al.

(10) Patent No.: US 7,128,106 B2
(45) Date of Patent: Oct. 31, 2006

(54) APPARATUS FOR REFUELING A DIRECT OXIDATION FUEL CELL

(75) Inventors: Juan J. Becerra, Altamont, NY (US); Michael S. DeFilippis, Niskayuna, NY (US); Todd P. Van Duser, Schenectady, NY (US)

(73) Assignee: The Gillette Company, Boston, MA (US)

( * ) Notice: Subject to any disclaimer, the term of this patent is extended or adjusted under 35 U.S.C. 154(b) by 624 days.

(21) Appl. No.: 10/413,982

(22) Filed: Apr. 15, 2003

(65) Prior Publication Data

US 2004/0209142 A1    Oct. 21, 2004

(51) Int. Cl.
*B65B 1/04* (2006.01)

(52) U.S. Cl. .................. 141/349; 141/2; 141/347; 429/39; 251/149.1

(58) Field of Classification Search .............. 141/2, 141/18, 283, 346–350; 429/27–39; 251/142, 251/149.1
See application file for complete search history.

(56) References Cited

U.S. PATENT DOCUMENTS

| 4,562,123 A | 12/1985 | Shimizu et al. |
| 5,599,638 A | 2/1997 | Surampudi et al. |
| 5,773,162 A | 6/1998 | Surampudi et al. |
| 5,952,117 A | 9/1999 | Colborn et al. |
| 6,194,095 B1 | 2/2001 | Hockaday |
| 6,250,348 B1 | 6/2001 | Reinholdt |
| 6,326,097 B1 * | 12/2001 | Hockaday ............... 429/34 |
| 6,458,479 B1 | 10/2002 | Ren et al. |
| 2002/0197522 A1 | 12/2002 | Lawrence et al. |
| 2003/0008193 A1 | 1/2003 | Kinkelaar et al. |

FOREIGN PATENT DOCUMENTS

| EP | 1 087 455 A2 | 3/2001 |
| EP | 1087455 A2 * | 3/2001 |
| EP | 1 313 160 A1 | 5/2003 |

OTHER PUBLICATIONS

PCT/US2004/011414, Notification of Transmittal of the International Search Report and the Written Opinion fo the International Searching Authority or the Declaration, European Patent Office, Jun. 7, 2005.

* cited by examiner

Primary Examiner—Timothy L. Maust
(74) Attorney, Agent, or Firm—Cesari and McKenna, LLP

(57) ABSTRACT

A refueling arrangement for a direct oxidation fuel cell. A refueling cartridge includes a coupling which is geometrically keyed to a fueling port associated with the fuel cell. By properly engaging the coupling with the fueling port, a fuel flow path is opened which allows fuel to pass from the cartridge to the fuel cell. Disengaging the coupling from the fueling port closes the fuel flow path. Refueling is accomplished in rapid, trouble-free and safe manner.

30 Claims, 4 Drawing Sheets

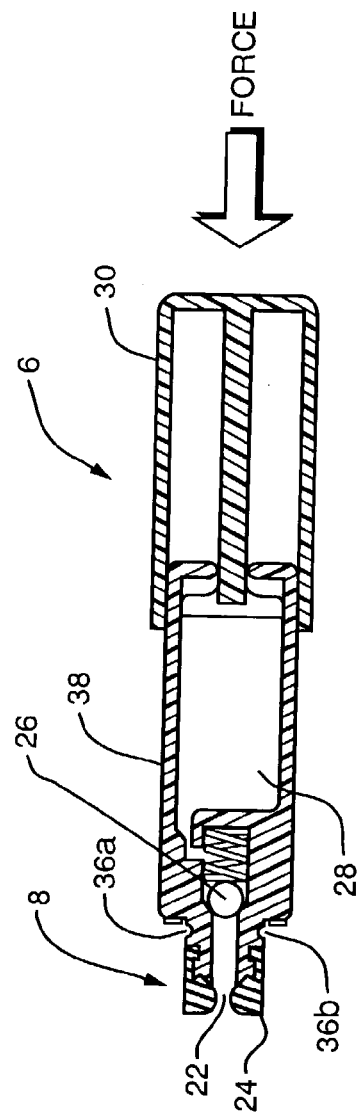
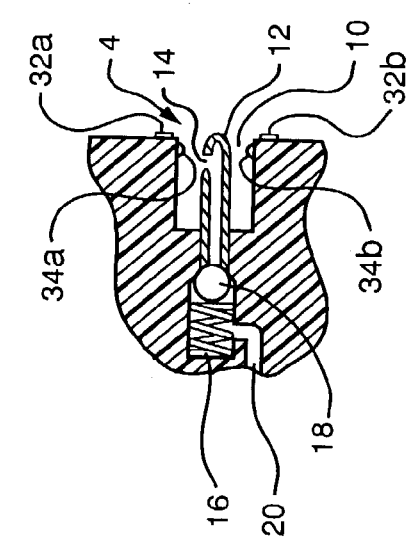
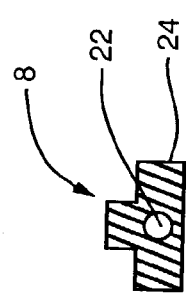
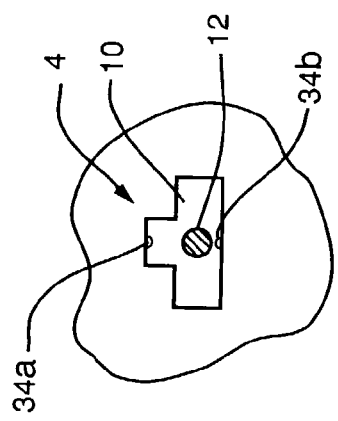
FIG. 2A
FIG. 2B
FIG. 2C
FIG. 2D

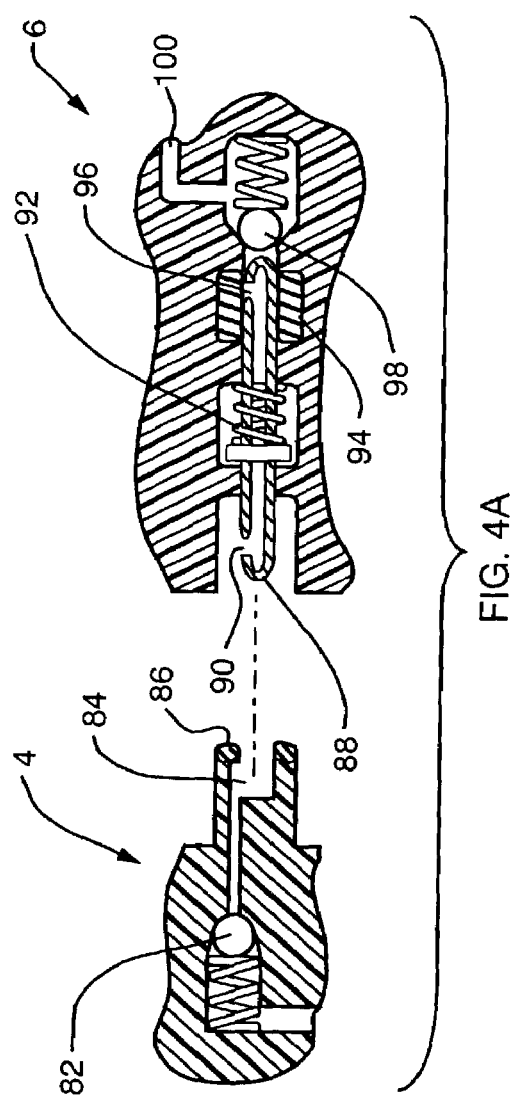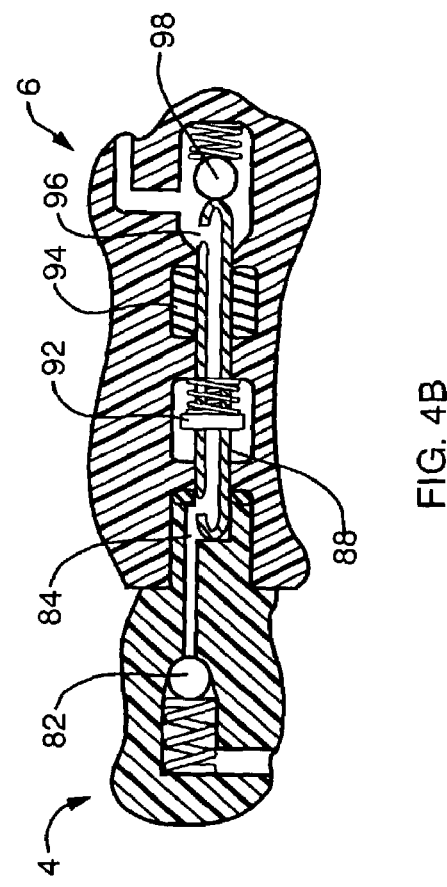
FIG. 4A
FIG. 4B

APPARATUS FOR REFUELING A DIRECT OXIDATION FUEL CELL

BACKGROUND OF THE INVENTION

1. Field of the Invention

The present invention relates generally to the field of direct oxidation fuel cells and, more specifically, to an arrangement for refueling a direct oxidation fuel cell.

2. Background Information

Fuel cells are devices in which an electrochemical reaction is used to generate electricity. A variety of materials may be suited for use as a fuel depending upon the materials chosen for the components of the cell. Organic materials, such as methanol or natural gas, are attractive choices for fuel due to the their high specific energy.

Fuel cell systems may be divided into "reformer-based" systems (i.e., those in which the fuel is processed in some fashion to extract hydrogen from the fuel before it is introduced into the fuel cell system) or "direct oxidation" systems in which the fuel is fed directly into the cell without the need for separate internal or external processing. Most currently available fuel cells are reformer-based fuel cell systems. However, because fuel processing is expensive and requires significant volume, reformer based systems are presently limited to comparatively high power applications.

Direct oxidation fuel cell systems may be better suited for a number of applications in smaller mobile devices (e.g., wireless phones, handheld and laptop computers), as well as in some larger applications. Typically, in direct oxidation fuel cells, a carbonaceous liquid fuel in an aqueous solution (typically aqueous methanol) is applied to the anode face of a membrane electrode assembly (MEA). The MEA contains a protonically-conductive but, electronically non-conductive membrane (PCM). Typically, a catalyst which enables direct oxidation of the fuel on the anode is disposed on the surface of the PCM (or is otherwise present in the anode chamber of the fuel cell). Protons (from hydrogen found in the fuel and water molecules involved in the anodic reaction) are separated from the electrons. The protons migrate through the PCM, which is impermeable to the electrons. The electrons thus seek a different path to reunite with the protons and oxygen molecules involved in the cathodic reaction and travel through a load, providing electrical power.

One type of direct oxidation fuel cell, the direct methanol fuel cell (DMFC), is of particular interest with respect to powering portable electronic devices. However, in order to successfully integrate DMFCs into a wide range of mass produced devices, one must address the problem of how to refuel the cell. In general, refueling should be done quickly, so as to minimize the downtime of the device which is powered by the DMFC, and in a way that is safe and reliable when performed by a user having a minimum of instruction.

SUMMARY OF THE INVENTION

In brief summary, the present invention provides an arrangement through which a direct oxidation fuel cell, including a fuel cell embedded within a device which it powers, may be quickly, easily and safely refueled by a person. This arrangement includes a fueling port, which is associated with the fuel cell, and a refueling cartridge having a coupling which is shaped and dimensioned to engage with the fueling port. The coupling includes a fuel flow path through which fuel may pass from the cartridge to the fueling port when the flow path is open.

In a preferred embodiment, the fueling port and fuel cartridge coupling are geometrically keyed to each other, thus preventing a user from engaging the port and coupling in an improper manner that could result in fuel spillage or leakage. Such keying may also function to prevent introduction of an inappropriate type of fuel into the fueling port, which could damage or destroy the fuel cell. In addition, the fueling port and coupling preferably cooperate with each other such that the fuel flow path may open, thus allowing fuel to flow, only in conjunction with a proper engagement of the port and coupling. Conversely, when the coupling is disengaged from the port, the fuel flow path is closed, thereby preventing leakage of fuel from the cartridge. This arrangement enables simple, trouble-free refueling to be performed by a user with a minimum of prior instruction and without necessarily turning off the device which is powered by the fuel cell. The refueling cartridge is preferably sized such that it may be conveniently carried by a user, typically in a pocket or purse, in the same manner as other personal items.

BRIEF DESCRIPTION OF THE DRAWINGS

The invention description below refers to the accompanying drawings, of which:

FIGS. 2A–2D show a fueling port and refueling cartridge constructed in accordance with a first embodiment of the present invention;

FIGS. 4A–4B show a fueling port and refueling cartridge constructed in accordance with a third embodiment of the present invention

DETAILED DESCRIPTION OF ILLUSTRATIVE EMBODIMENTS

Figure 1:
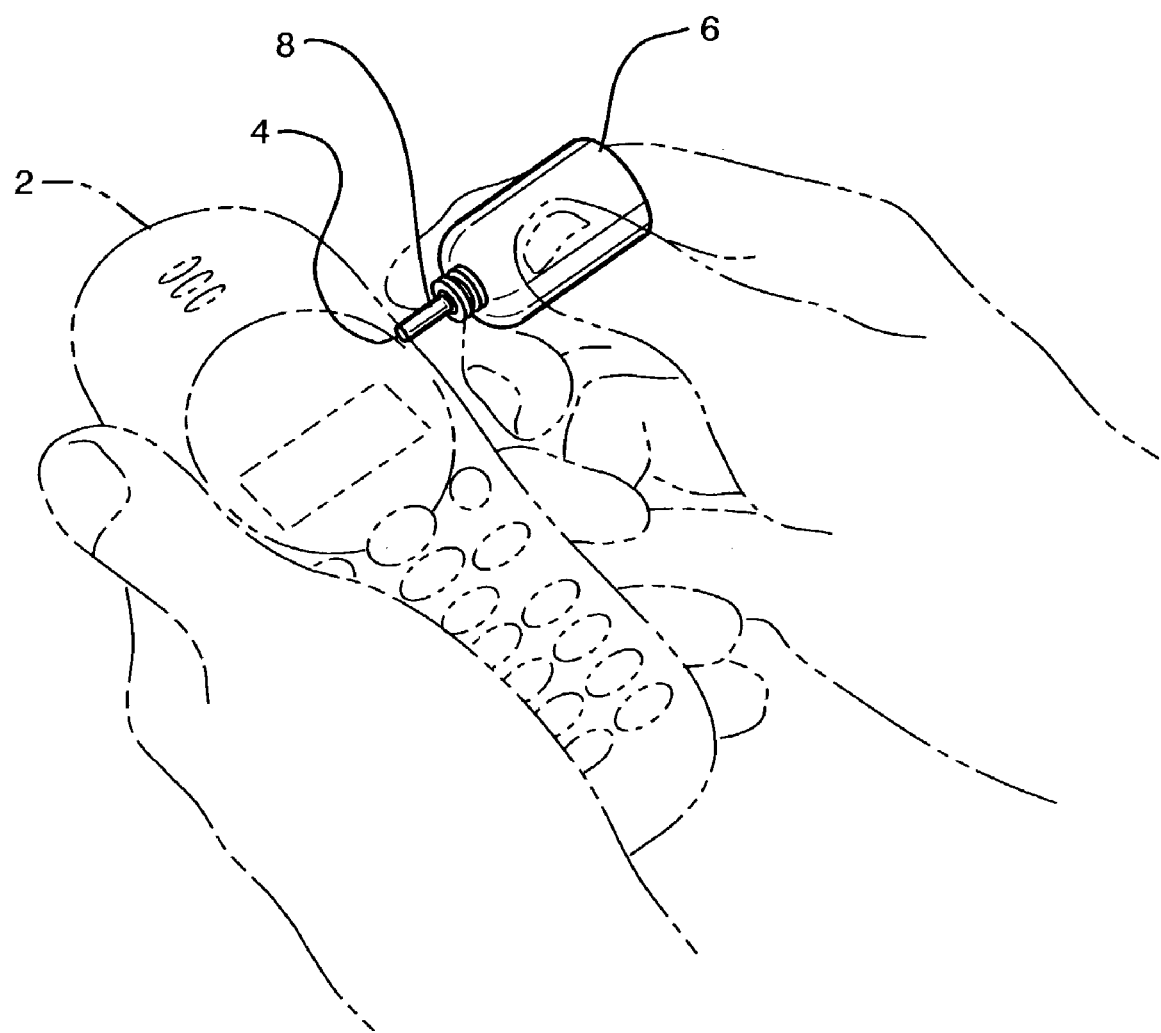
FIG. 1 is a perspective view of a wireless phone, powered by an internal direct oxidation fuel cell, which is in the process of being refueled.
Figure 3A:
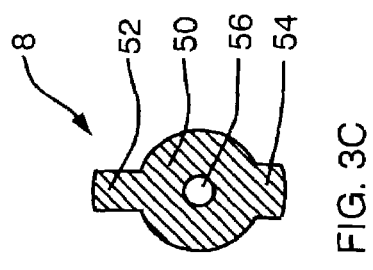
FIGS. 3A–3D show a fueling port and refueling cartridge constructed in accordance with a second embodiment of the present invention.
Figure 3B:
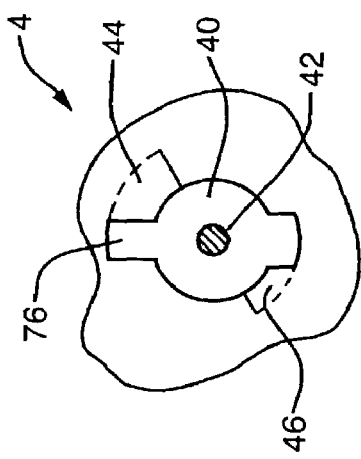
Figure 3C:
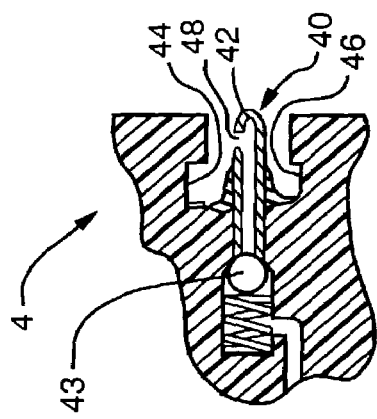
Figure 3D:
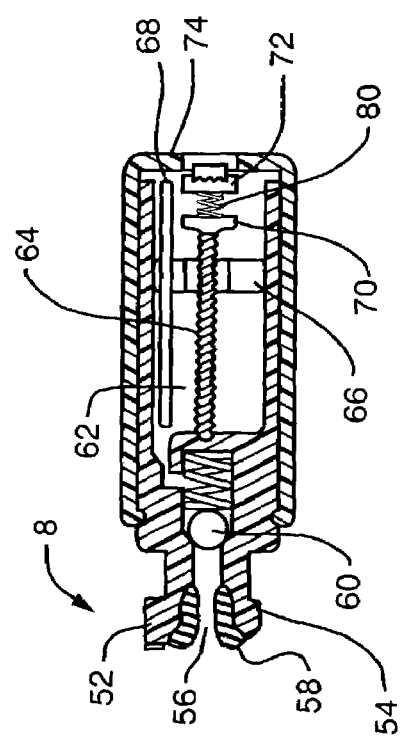

FIG. 1 shows a wireless phone 2, powered by an internal direct oxidation fuel cell (not shown), which is in the process of being refueled. On the right-hand side of wireless phone 2 is a fueling port 4. A refueling cartridge 6 is connected, by way of a coupling 8, to fueling port 4. As described in detail below, a user may use cartridge 6 to safely and easily refuel the internal fuel cell in a very short time. As shown in FIG. 2A, which is a side elevation of fueling port 4, and FIG. 2B, which is a section of that port, an inverted T-shaped recess 10 surrounds a tube 12. An aperture 14 is disposed on the top surface of tube 12 proximate to the exterior end of the tube. Tube 12 is held in a fixed position by the solid material which surrounds it. Adjacent to the interior end of tube 12 is a chamber 16 housing a ball valve 18. A fuel outlet 20 connects chamber 16 to a fuel reservoir (not shown) that is typically located within the interior of wireless phone 2 and supplies fuel to the internal direct oxidation fuel cell. A pair of outwardly-facing stops 32a, 32b are disposed, respectively, above and below recess 10. A pair of detents 34a, 34b are disposed, respectively, on the upper and lower surfaces of recess.

As shown in FIG. 2C, which is a side elevation of coupling 8, and FIG. 2D, which is a section of refueling cartridge 6 and coupling 8, cartridge 6 includes four major components: coupling 8, a ball valve 26, a fuel reservoir 28 and a user-operable plunger 30. Coupling 8 is geometrically keyed to fueling port 4. That is, coupling 8 includes an inverted T-shaped solid portion 24, having a central chamber 22 for receiving tube 12, dimensioned to snugly engage with fueling port 4. Coupling 8 also includes a pair of notches 36a, 36b which receive detents 34a, 34b, respectively, when coupling 8 is fully engaged with fueling port 4. An outer surface 38 of fuel reservoir 28 may be marked with visual indicators which indicate how much fuel remains in reservoir 28 based on the position of plunger in relation to the reservoir. Fuel reservoir 28 may hold a liquid fuel directly or a bladder (not shown) may be placed inside the reservoir. Alternatively, fuel reservoir 28 may hold (or be adapted to hold) a liquid fuel which is converted to a vapor before delivery, or a highly viscous or gelatinous mixture.

Coupling 8 is preferably constructed from a compliant seal material overmolded on rigid plastic. Suitable seal materials include fluoroelastomers, EPDM rubber, NBR, Neoprene and Tygon. Suitable plastics include high density polyethylene, high density polypropylene, polyethylene terathalate or its recycled materials and Delrin. Reservoir 28 and plunger 30 are preferably also constructed from rigid plastic. Tube 12 is preferably constructed from high quality stainless steel such as 316L. If desired, tube 12 could be coated in whole or in part with a catalyst or enzyme which would serve to oxidize any residual fuel which might remain following a refueling procedure. A catalyst or enzyme could similarly be used within the interior of chamber 22.

To perform a refueling procedure, a user simply manually grasps refueling cartridge 6 and inserts coupling 8 into fueling port 4. The keyed shapes of coupling 8 and recess 10 prevent the user from attempting to engage these elements in an incorrect orientation. As this happens, tube 12 is received within chamber 22. With the application of sufficient force, tube 12 will contact and force open ball valve 26. Contemporaneously with that action, detents 34a, 34b will engage with notches 36a, 36b, thus providing either an audible or tactile feedback to the user that coupling 8 is fully engaged with fueling port 4. In addition, the compliant seal material of the outer end of coupling 8 will form a liquid tight seal around tube 12.

At this point, the user applies force to plunger 30, which causes fuel to be displaced from reservoir 28, past ball valve 26, into chamber 22 and eventually into tube 12. With sufficient pressure (i.e., when the pressure exceeds the threshold pressure of ball valve 16), the fuel in tube 12 will open valve 16 and fuel will pass into outlet 20 for delivery to the fuel cell's reservoir. As pressure is reduced, ball valve 16 will close, thereby preventing any backflow of fuel into tube 12. The user may now disengage refueling cartridge 6 from fueling port 4 by pulling the components away from each other, thus exerting a pulling force on the plunger that in turn exerts a negative pressure on the fuel in tube 12, and disengages detents 32a, 32b. That action also causes ball valve 26 to return to its closed position and block the flow of any additional fuel from reservoir 28.

An alternative embodiment of the present invention is shown in FIGS. 3A–3D. In this embodiment, fueling port 4 includes an asymmetric "keyhole" shaped recess 50 having a tube 42 disposed near its center. An upper portion 76 of recess 50 is preferably shaped or dimensioned (or both) differently from a lower portion 78 of the recess. Further the interior surfaces 44, 46 form a coarse thread, preferably a fraction of one turn, such that insertion and rotation of coupling 8 causes a movement of coupling 8 towards fueling port 4. Upper portion 52 and lower portion 54 of coupling 8 are shaped and dimensioned to match the corresponding portions of recess 50, once again creating a keyed arrangement, as described above, which prevents a user from engaging fueling port 4 and coupling 8 in an incorrect orientation. Fueling port 4 also has a tube 42 similar in construction to tube 12 described above. A ball valve 43 is located in proximity to tube 42.

Refueling cartridge 6 includes a chamber 56 which is designed to receive tube 42. The outer end 58 of coupling 8 is preferably constructed from a seal material such as those described above. A ball valve 60 is disposed between chamber 56 and a fuel reservoir 62. Fuel is displaced from reservoir 62 by way of an assembly which includes a drive shaft 64, a slip clutch plunger 66, a stop 70, a spring 80, a ratchet gear 72 and a housing 74. A visual indication of the amount of fuel remaining in reservoir 62 may be gained through a viewing slot 68.

To perform a refueling procedure using the embodiment of the invention shown in FIGS. 3A–3D, a user simply manually grasps refueling cartridge 6, inserts coupling 8 into fueling port 4 until stopped by contact, and then turns cartridge 8 in a clockwise direction. This action causes portions 52 and 54 of coupling 8 to rotate into interior spaces 44, 46, respectively, which effectively draws in and locks coupling 8 in an engaged position. Contemporaneously, the seal material of outer end 58 forms a liquid tight seal around tube 42, and that tube makes contact with and displaces ball valve 60 into an open position.

At this point, the user may apply a torque, say clockwise, to housing 74. This action advances plunger 66 and displaces fuel past ball valve 60, into chamber 56 and into tube 42. The user will feel some back pressure and slip clutch plunger 66 will provide feedback to the user such as an audible "click" as it works to prevent the user from applying excessive torque to limit the maximum pressure of fuel. With sufficient pressure (i.e., when the pressure exceeds the threshold pressure of ball valve 43), the fuel in tube 42 will open valve 43 and fuel will pass to the fuel cell's reservoir. When the fuel cell's reservoir is full, a back pressure will develop sufficient to apply a stopping force to the slip clutch plunger 66 causing it to emit an audible click. The user may now disengage refueling cartridge 6 from fueling port 4 by rotating the cartridge in a counterclockwise direction. This relieves pressure from the slip clutch plunger 66 and fuel tube 42. As pressure is reduced, ball valve 43 closes, thereby preventing any backflow of fuel into tube 42 and preventing leaks as the coupling is further rotated. Counterclockwise rotation of the cartridge also engages ratchet gear 72, which in turn rotates features 52, 54 of coupling 8 inside the inner surfaces 44, 46 of coupling 4 causing a retraction of tube 42 from the ball valve 60 and stopping fuel. Further counterclockwise rotation is prevented as surfaces 52, 54 of coupling 8 and inner surfaces 44, 46 of coupling 4 interfere with each other. The user then pulls the components away from each other.

Turning now to FIGS. 4A–4B, a third embodiment of the present invention is shown. In this embodiment, the fueling port 4 includes a ball valve 82 which is disposed proximate to a chamber 84. Seal material 86, like that previously described, is provided on the outer end of port 4. Refueling cartridge 6 includes a tube 88 having an aperture 90 at its exterior end and an aperture 96 at its interior end. A stop/spring assembly 92 is disposed around the middle of tube 88 and a seal 94 is disposed between assembly 92 and a ball valve 98.

As shown in FIG. 4B, when fueling port 4 is engaged with refueling cartridge 6, tube 88 is moves laterally, thereby compressing stop/spring assembly 92, opening ball valve 98 and allowing aperture 96 to receive fuel from a reservoir (not shown) via inlet 100. At sufficient pressure, the fuel will displace ball valve 82 and flow from right to left. Conversely, when fueling port 4 and cartridge 6 are disengaged, tube 88 is urged back to its original position, and the fuel flow path is closed in each component.

It will be understood by those skilled in the art that the refueling arrangement of the present invention may be adapted for use with any of a wide variety of portable electronic devices or other electrical devices which may be powered by a direct oxidation fuel cell.

What is claimed is:

1. Apparatus for refueling a direct oxidation fuel cell comprising:
   a refueling cartridge; and
   a coupling, including a fuel flow path, for engagement of said cartridge with a fueling port associated with a direct oxidation fuel cell system, said coupling and said fueling port cooperating so as to permit said fuel flow path to open only in conjunction with proper engagement of said coupling and said fueling port, and to close said fuel flow path prior to or as a result of disengagement of said coupling from said fueling port, said coupling having:
   a tube disposed on said fueling port; and
   an inverted T-shaped solid member disposed on said coupling, said inverted T-shaped solid member having a central chamber for receiving said tube.

2. The apparatus as in claim 1 further comprising: a geometric key on said coupling for proper engagement to a complimentary geometric key on said fueling port.

3. The apparatus as in claim 2 further comprising: a coarse thread displaced on said geometric key, wherein insertion and rotation of said coupling establishes proper engagement with said fueling port.

4. The apparatus as in claim 2 wherein said geometric key includes at least one of the following: (i) means for preventing spills; (ii) means for preventing refueling with improper fuel; (iii) means for preventing faulty or improper use; (iv) means for properly opening and closing said fuel flow path; and (v) means for substantially sealing and unsealing said fuel flow path.

5. The apparatus as in claim 1 further comprising: one or more stops, detents, and notches disposed on said coupling or said fueling port for ensuring proper engagement of said coupling to said fueling port.

6. The apparatus as in claim 1 further comprising:
   at least one ball valve for opening and closing said fuel flow path in response to engagement of said tube and said inverted T-shaped solid member.

7. Apparatus for refueling a direct oxidation fuel cell comprising:
   a refueling cartridge; and
   a coupling, including a fuel flow path, for engagement of said cartridge with a fueling port associated with a direct oxidation fuel cell system, said coupling and said fueling port cooperating so as to permit said fuel flow path to open only in conjunction with proper engagement of said coupling and said fueling port, and to close said fuel flow path prior to or as a result of disengagement of said coupling from said fueling port;
   a fuel reservoir in said fuel cartridge, said fuel reservoir adapted to contain a fuel selected from the group consisting of a liquid fuel, a liquid fuel which is to be converted to vapor before delivery, and a highly viscous or gelatinous mixture; and
   a plunger for creating pressure within said fuel reservoir for releasing fuel into said fuel flow path, and wherein said plunger is adapted to provide user feedback when refueling is complete and wherein said user feedback is an audible feedback.

8. The apparatus as in claim 7 wherein said plunger is a slip clutch plunger.

9. The apparatus as in claim 8 wherein said slip clutch plunger is adapted to provide user feedback when refueling is complete.

10. The apparatus as in claim 7 further comprising: visual indicators of fuel levels in said fuel reservoir.

11. The apparatus as in claim 10 wherein said visual indicator is a viewing window.

12. The apparatus as in claim 7 further comprising: a compliant seal material disposed on said coupling for creating a substantially complete seal between said coupling and said fueling port.

13. The apparatus as in claim 12 wherein said seal material is selected from the group consisting of flouroelastomers, EPDM rubber, NBR, Neoprene, and Tygon.

14. The apparatus as in claim 7 wherein said coupling is comprised of a rigid plastic.

15. The apparatus as in claim 14 wherein said rigid plastic is selected from the group consisting of high density polyethylene, high density polypropylene, polyethylene terathalate or its recycled materials, and Delrin.

16. The apparatus as in claim 7 wherein said fueling port is disposed within an application device being powered by said direct oxidation fuel cell system.

17. A method for refueling a direct oxidation fuel cell comprising the steps of:
   providing a refueling cartridge having a coupling for engaging a fueling port associated with a direct oxidation fuel cell;
   cooperating together said coupling and said fueling port permitting said fuel flow path to open when proper engagement of said coupling to said fueling port is established;
   opening and closing at least one ball valve in response to engagement of a tube disposed on said fuel port and an inverted T-shaped solid member disposed on said coupling to control fuel flow; and
   closing said fuel flow path prior to or as a result of disengagement of said coupling from said fueling port.

18. The method as in claim 17 further comprising the step of: providing said fueling port and said coupling with complimentary geometric keys for defining proper engagement between said coupling and said fueling port thereby opening said fuel path.

19. The method as in claim 18 further comprising the step of: engaging said fueling port and said coupling by cooperating coarse threads disposed on said geometric keys, wherein said engaging comprises inserting and rotating said coupling to establish proper engagement with said fueling port.

20. The method as in claim 18 further comprising the step of: preventing spills by proper engagement of said geometric keys.

21. The method as in claim 18 further comprising the step of: preventing refueling with undesired fuel or other substances by proper engagement of said geometric keys.

22. The method as in claim 18 further comprising the step of: preventing faulty or improper use by proper engagement of said geometric keys.

23. The method as in claim 18 further comprising the step of: preventing improper opening and closing of said fuel flow path by proper engagement of said geometric keys.

24. The method as in claim 17 further comprising the step of: providing a system having one or more stops, detents, and notches on said coupling or said fueling port for ensuring proper engagement of said coupling to said fueling port.

25. The method as in claim 17 further comprising the step of: sealing said coupling and said fueling port with compliant seal material.

26. A method for refueling a direct oxidation fuel cell comprising the steps of:
   providing a refueling cartridge having a coupling for engaging a fueling port associated with a direct oxidation fuel cell;
   cooperating together said coupling and said fueling port permitting a fuel flow path to open when proper engagement of said coupling to said fueling port is established;
   providing a fuel reservoir adapted to contain a fuel selected from the group consisting of a liquid fuel, a liquid fuel which is to be converted to vapor before delivery, and a highly viscous or gelatinous mixture;
   creating pressure within said fuel reservoir by a slip clutch plunger for releasing fuel into said fuel flow path; and
   creating an audible feedback by said slip clutch plunger when refueling is complete; and
   closing said fuel flow path prior to or as a result of disengagement of said coupling from said fueling port.

27. The method as in claim 26 further comprising the step of: providing a ratcheting assembly in association with said fuel reservoir.

28. The method as in claim 26 further comprising the step of: creating a visual indication of fuel levels in said fuel reservoir.

29. The method as in claim 28 further comprising the step of: providing a viewing window for said visual indication.

30. An apparatus for refueling a direct oxidation fuel cell, comprising:
   means for providing a refueling cartridge having a coupling for engaging a fueling port associated with a direct oxidation fuel cell;
   means for cooperating together said coupling and said fueling port permitting said fuel flow path to open when proper engagement of said coupling to said fueling port is established;
   means for creating pressure within an associated fuel reservoir by a slip clutch plunger for releasing fuel into said fuel flow path;
   means for creating an audible feedback by said slip clutch plunger when refueling is complete; and
   means for closing said fuel flow path prior to or as a result of disengagement of said coupling from said fueling port.

* * * * *